March 20, 1956  J. F. GALL ET AL  2,739,114

FLUORINE CELL

Filed June 7, 1952

INVENTOR.

United States Patent Office 2,739,114
Patented Mar. 20, 1956

2,739,114
FLUORINE CELL

John F. Gall, Narberth, and Henry C. Miller, Wyndmoor, Pa., assignors to The Pennsylvania Salt Manufacturing Company, Philadelphia, Pa., a corporation of Pennsylvania Application June 7, 1952, Serial No. 292,328

10 Claims. (Cl. 204—243)

This invention relates to electrolytic apparatus for the manufacture of fluorine and more particularly to anode insulation in electrolytic cells of this nature the present application being a continuation-in-part of our copending application Serial No. 773,918, filed September 13, 1947, now abandoned.

It has long been a problem in the production of elemental fluorine to properly insulate the anode or anode lead from the remainder of the cell. The material used must be resistant to fluorine under the operating conditions of the cell and should have sufficient strength to withstand the shock resulting from minor cell explosions. The material must also be substantially impervious so as to prevent escape of fluorine from the cell.

In the past, many materials have been tried for this purpose. Among those tried are fluorspar, cements of fluorspar and sodium silicate, Portland cement, phenolaldehyde cements, alumina and polymerized fluoroethylene products. However, none of these materials has proved to be entirely satisfactory, the materials generally failing after short periods of cell operation.

We have now discovered that by using certain metal phosphate compositions, namely compositions having at least a matrix of a cupric phosphate, an aluminum phosphate, or an iron phosphate in which the average valence of the iron is less than 3, as the sealing and insulating material for the anode, cells can be run for extended periods without showing any failure of the anode insulation.

These cement materials are preferably first prepared in plastic form by mixing phosphoric acid with one or more of the oxides, i. e., cupric oxide, aluminum oxide or an iron oxide of a lower state of oxidation than ferric oxide, e. g., ferrosoferric oxide or ferrous oxide; a filler resistant to attack by the fluorine or fluorides may also be included in the mix. The plastic is then suitably molded, e. g., by casting, extrusion, pressing into place as a cement or joining compound, or by other means. The plastic thus prepared is self-hardening.

Figure 1:
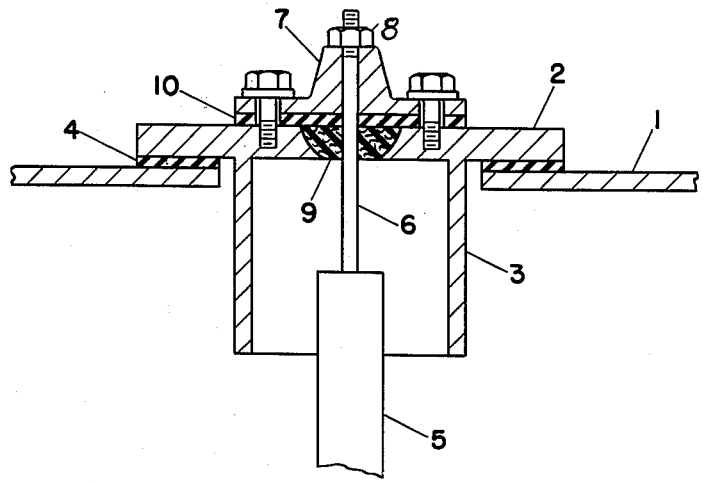
Figure 2:
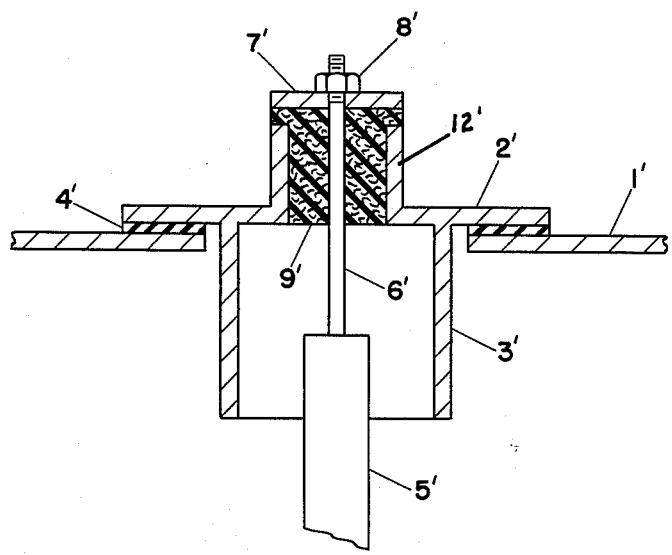

Two examples of how anodes may be secured in the cell and insulated therefrom by the phosphate cements herein described are illustrated by the drawings in which:

Figure 1 is a cross-sectional view showing a portion of a cell with the anode secured therein; and Figure 2 is a cross-sectional view of a cell showing a different method of insulating the anode from the cell.

Referring to Figure 1 of the drawings, 1 designates the top of the cell on which rests a cover member 2 having downwardly extending gas barriers 3. A gasket 4 serves to prevent leakage between the cover member 2 and the cell top 1. The anode 5 is secured to a conducting spindle 6 which is supported from a spindle holder 7, through nut 8. The spindle and attached anode 5 are insulated from the cover member 2 by cement 9, which is a phosphate cement of the type herein described. An insulating gasket 10 is placed between the spindle holder 7 and the cover 2. The spindle holder is insulated from the bolts used to secure it to the cover member in any conventional manner. For example, insulating washers may be used for this purpose.

In assembling the structure of Figure 1, the spindle holder and cover member are preferably first assembled and then inverted; the phosphate cement is then poured into place.

In the cell structure shown in Figure 2, the cover member 2' contains a raised flange 12' forming a well through which the anode spindle 6' passes. The well is filled with the phosphate cement 9' which serves to seal the anode spindle in cover 2' while insulating the spindle from the cover. In order to avoid unnecessary description, the same numerals have been used in Figures 1 and 2 to identify the same or equivalent parts.

Though two methods of securing the anode in the cell, using the cement phosphates herein described, have been illustrated in the drawings, it is obvious that many structural modifications might be made wherein the phosphate cements still act as the anode insulating material; the invention, therefore, is not to be limited to the specific structures illustrated but consists broadly in the discovery that substantially improved cell structures are obtained if a phosphate cement of the type herein described is used to insulate the anode from the remainder of the cell.

We have found it desirable in preparing phosphate cements for anode insulation to employ aqueous phosphoric acid of 70 to 100% acid concentration; preferably, 80% orthophosphoric acid is employed. This is mixed with 1 to 10 parts by weight of metal oxide for each part by weight of phosphoric acid; preferably, 2 parts by weight of oxide are employed for each part by weight of acid.

The metal oxide is preferably employed in powder form which may range in particle size from 35 mesh to 250 mesh. Preferably about 50% of the solid should be of a particle size ranging from about 60 to 150 mesh. Two or more of the metal oxides named may be used in admixture in preparing these compositions. Since there is generally more metal oxide present than will react with the phosphoric acid, a part of the metal oxide reacts to form a metal phosphate (probably of complex constitution) and this forms a matrix enclosing or cementing together particles of unreacted metal oxide. Particles of any filler that is added are similarly held. A composition of particularly advantageous plastic properties may be made by employing both magnetite and aluminum oxide as the metal oxides and employing rouge (ferric oxide) as a filler. One such composition is described in Example 5 below.

We have further found that the setting time of these compositions may be controlled by the degree of calcination of the metal oxide prior to mixing with the phosphoric acid. Thus, when uncalcined copper or iron oxides were employed, setting times ranging from one half minute to several minutes were observed in many instances. When these materials were calcined by heating in air at 1000° C. for 20 minutes, the setting time was usually increased more than one hundred fold, i. e., setting times ranged from around an hour to several hours. Intermediate degrees of calcination may be employed to obtain intermediate setting times.

The following examples are illustrative of various phosphate cement compositions that can be used for anode insulation in the practice of our invention:

Example 1

A copper phosphate plastic was prepared by mixing two parts by weight of calcined copper oxide (CuO) of such particle size that 25% by weight ranged from 35 to 60 mesh, 50% by weight ranged from 60 to 150 mesh and 25% ranged from 150 to 250 mesh, with one part by weight of an 80% phosphoric acid. Part of the copper oxide reacted slowly with the phosphoric acid to form a copper phosphate, and the plastic hardened over a period of a few hours to form a rigid solid mass that consisted essentially of a matrix of solid copper phosphate enclosing particles of the unreacted metal oxide.

*Example 2*

An iron phosphate plastic mix was prepared exactly as described in connection with the copper phosphate of Example 1 except that magnetite (naturally occurring $Fe_3O_4$) was used in place of copper oxide. The particle size of the solid, the acid concentration and the ratio of acid to powder were exactly as specified in Example 1.

The iron phosphate composition was found particularly desirable for insulation of the anode when the cover of the electrolytic cell was made of ferrous metal.

*Example 3*

The composition described in Example 2 may also be made using black oxide of iron (manufactured $Fe_3O_4$) instead of the magnetite.

*Example 4*

A material which has the property of being resistant to fluorine and fluorides and the additional property, unusual in the field of inorganic products, of showing a reversible thermoplasticity, i. e., the property of softening when its temperature is raised and of hardening again upon lowering the temperature, was made by employing a powder of alumina (for example, the hydrated oxide called "Aluminum Hydroxide"—$Al_2O_3 \cdot xH_2O$), instead of the copper oxide or $Fe_3O_4$. In this case, 1 part by weight of hydrated aluminum oxide was added to 2 parts by weight of 80% phosphoric acid which had been heated to about 100° C. and the aluminum oxide was stirred in. A product was formed which was hard below 20° C., but which was soft and plastic above this temperature. A similar product which softened above −5° C. was made by using a ratio of 5 parts by weight of acid to one of the hydrated oxide. On the other hand, a product made in the same way but using a ratio of 1 part by weight of acid to one part by weight of the hydrated oxide did not soften below 100° C.; at temperatures at which they are rigid solids these aluminum phosphate compositions are excellent for insulating and sealing the anode in the cell.

*Example 5*

As above stated, more than one of the metal oxides named may be employed at one time in preparing the plastic from which the structures of our invention are made. Thus, for example, three parts by weight of magnetite of particle size as described in Example 2, one part by weight of the aluminum oxide powder and four parts by weight of rouge were mixed with 80% phosphoric acid in the proportion of one part by weight of total solid to two parts by weight of acid.

In this particular mixture the rouge is used principally as a filler but it apparently also acts somewhat as a plasticizer. That is, it adds to the mixture's unique plastic properties whereby the composition can withstand severe mechanical shock without cracking or shattering.

We have found that it is feasible to vary the proportions of the three solids employed in this particular mixture so that for every three parts by weight of magnetite there may be employed from 0 to 8 parts by weight of rouge, and from 0 to 3 parts by weight of aluminum oxide. Similarly the phosphoric acid concentration and the ratio of acid to solid may be varied as described above. Such compositions, made from mixes including ferrosoferric oxide, aluminum oxide and ferric oxide, are important new materials of construction.

Since many modifications are possible in the structure and process of our invention as above described without departure from the scope of the invention, it is intended that the above description of our invention should be interpreted as illustrative, and the invention should, therefore, not be limited thereby.

Having thus described our invention, we claim:

1. In an electrolytic cell for the production of fluorine, a cell cover having an opening therein, an anode structure including a supporting spindle passing through said opening and held in a fixed position with respect to said cover and insulated therefrom by a metal phosphate, the metal radical being selected from the group consisting of copper, aluminum and iron of average valence less than 3.

2. In an electrolytic cell for the production of fluorine, a cell cover having an opening therein, an anode member including a supporting spindle passing through said opening and held in a fixed position with respect to said cover and insulated therefrom by an aluminum phosphate, said aluminum phosphate also serving to seal said opening to prevent escape of corrosive gases therethrough.

3. In an electrolytic cell for the production of fluorine, a cell cover having an opening passing therethrough, an anode structure including a supporting spindle passing through said opening and a cupric phosphate positioned between said anode structure and said cell cover to electrically insulate said anode structure from said cover and to prevent escape of corrosive gases through said opening.

4. In an electrolytic cell for the production of fluorine, a cell cover having an opening passing therethrough, an anode structure including a supporting spindle passing through said opening and an iron phosphate in which the average valence of iron is less than 3 positioned between said anode structure and said cell cover to electrically insulate said anode structure from said cover and to prevent escape of corrosive gases through said opening.

5. In an electrolytic cell for the production of fluorine, a cell cover having an opening passing therethrough, an anode structure including a supporting spindle passing through said opening and a self-hardening plastic positioned between said anode structure and said cell cover to electrically insulate said anode structure from said cover and to prevent escape of corrosive gases through said opening, said self-hardening plastic being made by mixing phosphoric acid with at least one metal oxide selected from the group consisting of cupric oxide, iron oxide in which the average valence of iron is less than 3, and aluminum oxide.

6. In an electrolytic cell for the production of fluorine, a cell cover having an opening passing therethrough, an anode structure including a supporting spindle passing through said opening and a self-hardening plastic positioned between said anode structure and said cell cover to electrically insulate said anode structure from said cover and to prevent escape of corrosive gases through said opening, said self-hardening plastic being made by mixing phosphoric acid with at least one metal oxide selected from the group consisting of cupric oxide and iron oxide in which the average valence of iron is less than 3, the ratio by weight of metal oxide to phosphoric acid in said mixture being 1 to 10 parts oxide per part phosphoric acid.

7. In an electrolytic cell for the production of fluorine an anode extending downwardly into the cell and held in fixed relation with respect to the cell and insulated therefrom by a metal phosphate cement the metal radical of which is selected from the group consisting of copper, aluminum, and iron of average valence less than 3.

8. In an electrolytic cell for the production of fluorine, a cell cover having an opening therethrough, an anode structure passing through said opening and held in fixed relation with respect to said cover and insulated therefrom by a metal phosphate cement, the metal radical being selected from the group consisting of copper, aluminum, and iron of average valence less than 3.

9. In an electrolytic cell for the production of fluorine, a gas barrier extending downwardly within the cell and having a laterally extending portion acting as a partial cover for said cell and an anode extending within said cell held in fixed relation with respect to said gas barrier and insulated therefrom by a metal phosphate cement, the metal radical of which is selected from the group consisting of copper, aluminum, and iron of average valence less than 3.

10. The method of insulating the anode from the remainder of the cell in an electrolytic cell for the manufacture of fluorine comprising surrounding the portion of the anode which would otherwise come in contact with said cell with a metal phosphate cement, the metal radical of which is selected from the group consisting of copper, aluminum, and iron of average valence less than 3.

References Cited in the file of this patent

UNITED STATES PATENTS

| | | |
|---|---|---|
| 1,254,263 | Oeschger | Jan. 22, 1918 |
| 1,261,750 | Allen | Apr. 9, 1918 |
| 1,570,202 | Buck | Jan. 19, 1926 |
| 2,034,458 | Calcott | Mar. 17, 1936 |

OTHER REFERENCES

Gehauf: "Electrolytic Cell for the Production of Fluorine," OTS publication P. B. 6365, Mar. 7, 1937, page 5 and plate I pertinent.